(12) United States Patent
Huang et al.

(10) Patent No.: US 9,209,847 B2
(45) Date of Patent: Dec. 8, 2015

(54) METHOD AND DEVICE FOR ACHIEVING CMMB DIVERSITY RECEPTION

(75) Inventors: Zhi Huang, Shenzhen (CN); Li Chen, Shenzhen (CN); Shangyuan Wang, Shenzhen (CN)

(73) Assignees: ZTE CORPORATION, Shenzhen (CN); ZTE Microelectronics Technology Co. Ltd., Shenzhen (CN)

( * ) Notice: Subject to any disclaimer, the term of this patent is extended or adjusted under 35 U.S.C. 154(b) by 0 days.

(21) Appl. No.: 14/396,480

(22) PCT Filed: Jul. 13, 2012

(86) PCT No.: PCT/CN2012/078592
§ 371 (c)(1),
(2), (4) Date: Oct. 23, 2014

(87) PCT Pub. No.: WO2013/159459
PCT Pub. Date: Oct. 31, 2013

(65) Prior Publication Data
US 2015/0092897 A1  Apr. 2, 2015

(30) Foreign Application Priority Data
Apr. 23, 2012  (CN) .......................... 2012 1 0121343

(51) Int. Cl.
*H04B 1/12* (2006.01)
*H04B 7/08* (2006.01)
*H04L 27/26* (2006.01)

(52) U.S. Cl.
CPC .. *H04B 1/12* (2013.01); *H04B 7/08* (2013.01); *H04B 7/084* (2013.01); *H04L 27/2647* (2013.01)

(58) Field of Classification Search
CPC .......... H04B 7/02; H04B 7/0413; H04B 7/08; H04B 7/0842; H04B 7/0845; H04B 7/0857; H04B 7/0865; H04L 1/02
USPC .......... 375/260, 340, 316, 346, 347; 455/101, 455/132, 500, 562.1
See application file for complete search history.

(56) References Cited

U.S. PATENT DOCUMENTS

| | | | |
|---|---|---|---|
| 2003/0072255 A1 | 4/2003 | Ma et al. | |
| 2009/0089851 A1* | 4/2009 | Guo et al. | 725/125 |
| 2011/0026579 A1* | 2/2011 | Yang | 375/233 |

FOREIGN PATENT DOCUMENTS

| | | |
|---|---|---|
| CN | 1885848 | 12/2006 |
| CN | 1905547 | 1/2007 |

(Continued)

*Primary Examiner* — Leon Flores
(74) *Attorney, Agent, or Firm* — Pearl Cohen Zedek Latzer Baratz LLP (57) ABSTRACT

A method and apparatus for achieving China Mobile Multimedia Broadcasting (CMMB) diversity reception are disclosed. The method includes: acquiring respective Analogue-to-Digital Converter (ADC) data of two antennas; respectively conducting a synchronization and Fast Fourier Transform (FFT) operation on the ADC data of the two antennas, acquiring delay information about the two antennas, and according to an operation result, selecting a signal to noise ratio (SNR) configuration parameter; according to the delay information, conducting delay compensation on the operated data; and according to the selected SNR configuration parameter, merging the data of the two antennas on which the delay compensation is conducted, and outputting the data. The method and apparatus are able to acquire a signal with extremely small interference and acquire a higher mobile performance.

12 Claims, 4 Drawing Sheets

(56) References Cited

FOREIGN PATENT DOCUMENTS

| CN | 101138178 | 3/2008 |
|---|---|---|
| CN | 101162933 | 4/2008 |
| JP | 2008/042306 | 2/2008 |
| KR | 2010/0074064 | 7/2010 |
| WO | WO 2005/002277 | 3/2005 |
| WO | WO 2009/031805 | 3/2009 |
| WO | WO 2011/002935 | 1/2011 |

\* cited by examiner

METHOD AND DEVICE FOR ACHIEVING CMMB DIVERSITY RECEPTION

CROSS-REFERENCE TO RELATED APPLICATIONS

This application is a National Phase Application of PCT International Application No. PCT/CN2012/078592, entitled "METHOD AND DEVICE FOR ACHIEVING CMMB DIVERSITY RECEPTION", International Filing date Jul. 13, 2012, published on Oct. 31, 2013 as International Publication No. WO 2013/159459, which in turn claims priority from Chinese Patent Application No. 201210121343.4, filed Apr. 23, 2012, all of which are incorporated herein by reference in their entirety.

TECHNICAL FIELD

The present document relates to the field of wireless communication technology, and in particular, to a method and apparatus for achieving China Mobile Multimedia Broadcasting (CMBB) diversity reception.

BACKGROUND OF THE RELATED ART

In a mobile communication system, a mobile communication channel is a multipath fading channel. A signal transmitted in the mobile communication system can reach a reception terminal only by being directly transmitted, reflected and scattered etc. through multiple propagation paths. In addition, with the mobility of a mobile CMMB terminal, the burden, delay and phase of the signal on various propagation paths change anytime and anywhere. Therefore, a level of the signal received by the receiver is unstable, and these multipath signals with different phases are added together to form fading. The change in the amplitude of the added signals complies with a Rayleigh distribution, and therefore, it is referred to as Rayleigh fading. When the Rayleigh fading rapidly changes with time, it is referred to as "fast fading". The shadow fading is a slow change in a median of signal due to the influence of the terrain (for example, block of a building etc.).

At present, diversity reception is generally used to overcome multipath fading. With such method, the receiver can make a decision on multiple received signals with the same information and independent fading characteristics after conducting a merging process. Wherein, spatial diversity can be used to reduce the influence of slow fading, i.e., the signal is transmitted and received respectively using several independent antennas or at different positions to ensure independence of fading among various signals. As the geographical environments are different in the process of transmitting these signals, the fading of various signals is also different. If a selective merging technology is used to select a stronger output therefrom, the influence of the factors such as terrain on the signals can be reduced.

However, the existing method for achieving diversity reception reduces the mobile performance of the CMMB reception terminal.

SUMMARY OF THE INVENTION

The main purpose of the present document is to provide a method and apparatus for achieving CMMB diversity reception, which is intended to improve the mobile performance of the CMMB reception terminal.

In order to achieve the above purpose, the present document provides a method for achieving CMMB diversity reception, comprising:

acquiring respective Analogue-to-Digital Converter (ADC) data of two antennas;

respectively conducting a synchronization and Fast Fourier Transform (FFT) operation on the ADC data of the two antennas to acquire delay information about the two antennas, and selecting a signal to noise ratio (SNR) configuration parameter according to an operation result;

according to the delay information, conducting delay compensation on the operated data; and according to the selected SNR configuration parameter, merging the data of the two antennas on which the delay compensation is conducted, and outputting the data.

Preferably, the step of respectively conducting a synchronization and FFT operation on the ADC data of the two antennas to acquire delay information about the two antennas comprises:

respectively conducting a mixing process on the ADC data of the two antennas according to a Central Processing Unit (CPU) configuration;

conducting a coarse synchronization operation on the data on which the mixing process is conducted according to a signal feature of the ADC data;

conducting a FFT operation on the data on which the coarse synchronization operation is conducted;

conducting a fine synchronization operation on the data on which the FFT operation is conducted to acquire offset values of the two antennas with respect to a predetermined clock; and acquiring the delay information about the two antennas according to the offset values.

Preferably, before the step of conducting the FFT operation on the data on which the coarse synchronization operation is conducted, the method further comprises:

intercepting 2K data from the data on which the coarse synchronization operation is conducted for the FFT operation.

Preferably, the step of selecting a SNR configuration parameter according to an operation result comprises:

conducting a masking process on related subcarriers according to 2K subcarriers acquired after the FFT operation is conducted;

multiplying the data on which the masking process is conducted with a synchronous serial number and then conducting a saturation and normalization process on the data; and accumulating power values of the $256^{th}$-$767^{th}$ subcarriers from a position of a first path of the fine synchronization, and reporting the accumulated power values to the CPU so that the CPU calculates a noise power and selects the SNR configuration parameter.

Preferably, the FFT operation is a 2048-point FFT.

The present document further provides an apparatus for achieving CMMB diversity reception, comprising:

an acquisition module, configured to acquire respective ADC data of two antennas;

an operation and selection module, configured to respectively conduct a synchronization and FFT operation on the ADC data of the two antennas to acquire delay information about the two antennas, and select a signal to noise ratio (SNR) configuration parameter according to an operation result;

a delay compensation module, configured to conduct delay compensation on the operated data according to the delay information; and a merging and outputting module, configured to merge the data of the two antennas on which the delay compensation is conducted according to the selected SNR configuration parameter and output the data.

Preferably, the operation and selection module comprises:

a mixing process unit, configured to respectively conduct a mixing process on the ADC data of the two antennas according to a Central Processing Unit (CPU) configuration;

a coarse synchronization operation unit, configured to conduct a coarse synchronization operation on the data on which the mixing process is conducted according to a signal feature of the ADC data;

a FFT operation unit, configured to conduct a FFT operation on the data on which the coarse synchronization operation is conducted;

a fine synchronization operation unit, configured to conduct a fine synchronization operation on the data on which the FFT operation is conducted to acquire offset values of the two antennas with respect to a predetermined clock; and an acquisition unit, configured to acquire the delay information about the two antennas according to the offset values.

Preferably, the operation and selection module further comprises:

an interception unit, configured to be connected between the coarse synchronization operation unit and the FFT operation unit, to intercept 2K data from the data on which the coarse synchronization operation is conducted for the FFT operation.

Preferably, the operation and selection module further comprises:

a masking process unit, configured to conduct a masking process on related subcarriers according to 2K subcarriers acquired after the FFT operation is conducted;

a normalization process unit, configured to multiply the data on which the masking process is conducted with a synchronous serial number and then conduct a saturation and normalization process on the data; and an accumulation and selection unit, configured to accumulate power values of the $256^{th}$-$767^{th}$ subcarriers from a position of a first path of the fine synchronization, and report the accumulated power values to the CPU so that the CPU calculates a noise power and selects the SNR configuration parameter.

Preferably, the FFT operation is a 2048-point FFT.

The method and apparatus for achieving the CMMB diversity reception according to the embodiments of the present invention conduct a synchronization and FFT operation on the respective ADC data of the two antennas to obtain delay information about the two antennas, and select a SNR configuration parameter according to an operation result; according to the delay information, conduct delay compensation on the operated data; and finally according to the selected SNR configuration parameter, configure a merging system of the two antennas, to merge the data of the two antennas on which the delay compensation is conducted, and output the data, thereby being able to obtain a signal with extremely small interference and thus improve the mobile performance of the CMMB reception terminal.

In order to make the technical schemes of the present document more clear and obvious, the technical schemes will be further described in detail below in conjunction with accompanying drawings.

PREFERRED EMBODIMENTS OF THE PRESENT INVENTION

The solution of the embodiments of the present invention primarily is that a synchronization and FFT operation is respectively conducted on the ADC data of the two antennas to obtain delay information about the two antennas, and a signal to noise ratio (SNR) configuration parameter is selected according to an operation result; according to the delay information, delay compensation is conducted on the operated data; and finally according to the selected SNR configuration parameter, a merging system of the two antennas is configured to merge the data of the two antennas on which the delay compensation is conducted and output the data, thereby being able to obtain a signal with extremely small interference and obtain a higher mobile performance.

The embodiments of the present invention primarily solve the problem of time synchronization and merging and selection of dual antennas on the CMMB mobile terminal. In consideration that at present the CMMB primarily covers the urban scope, in such environment, the transmitted signal can reach the reception terminal only by being directly transmitted, reflected and scattered etc. through multiple propagation paths. However, reflection, scatter and refraction at many times will generate a very complex channel, and if the space has a change, there may be a very large change in the field intensity. When two reception channels are used, the fading influences subjected by the paths are not related, and the possibility that the two paths are influenced by a valley point of deep fading at the same time is very small. Therefore, dual antennas are adopted to respectively receive a signal independently, and then channel selection is conducted or signals of the dual antennas are merged, thereby being able to obtain a signal with extremely small interference and obtain a higher mobile performance.

Figure 1:
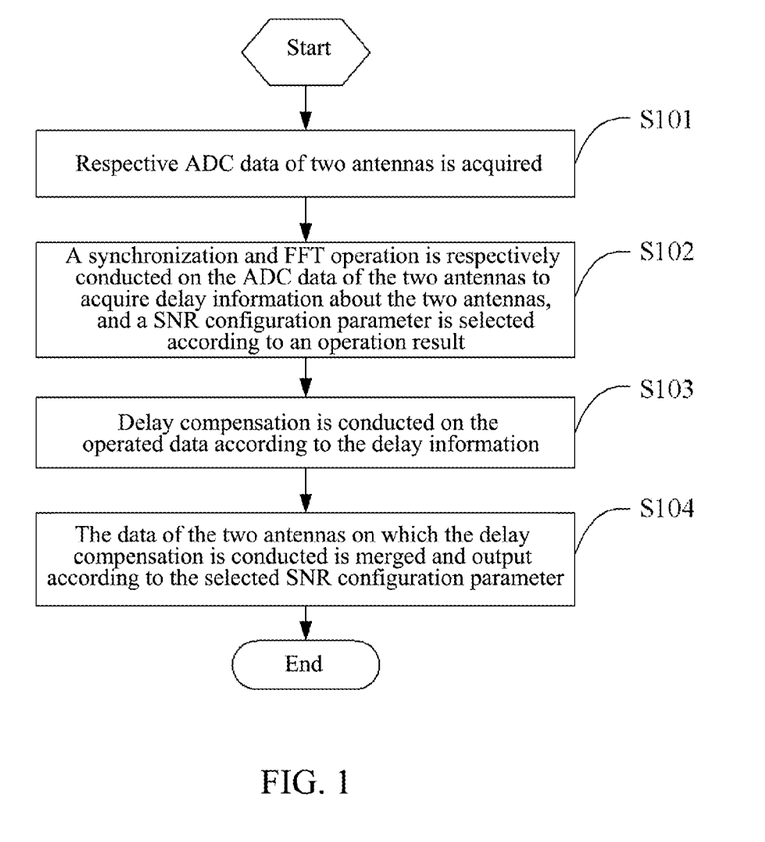
FIG. 1 is a flowchart of an embodiment of a method for achieving CMMB diversity reception according to the present document.

Specifically, as shown in FIG. 1, an embodiment of the present invention provides a method for achieving CMMB diversity reception, comprising the following steps:

In step S101, respective ADC data of two antennas is acquired.

Firstly, the two antennas respectively acquire respective ADC data, so as to conduct corresponding processes on the ADC data subsequently and then merge and output the data, to obtain a signal with extremely small interference and obtain a higher mobile performance.

In step S102, a synchronization and FFT operation is respectively conducted on the ADC data of the two antennas to acquire delay information about the two antennas, and a SNR configuration parameter is selected according to an operation result;

Wherein, the synchronization operation includes a coarse synchronization operation and a fine synchronization operation, and the FFT operation is a 2048-point FFT.

The embodiment relates to a method for time synchronization and antenna merging designed primarily for the basic features of the synchronous header of the CMMB. As the synchronous header is obtained by copying 2048 sampling points once, 2048-point FFT is used to transform data from the time-domain into the frequency-domain.

Firstly, the coarse synchronization operation and then the FFT operation are conducted on the ADC data, and then after the fine synchronization operation is conducted, offset values of the two antennas with respect to the uniform clock is acquired, and delay information about the two antennas can be acquired according to the offset values, so as to subsequently conduct delay compensation on the data of the two antennas according to the delay information.

After the FFT transform is conducted, some unnecessary direct current subcarrier, idle subcarriers and interference carriers in the frequency domain are masked, and then after the data is multiplied with a synchronous serial number, a saturation and normalization process is conducted on the data. Then, power values of the $256^{th}$-$767^{th}$ subcarriers are directly accumulated from a position of a first path of the fine synchronization, and the power values are reported to the CPU to calculate a noise power and select a SNR configuration parameter. In this way, the merging system of the two antennas is configured subsequently according to the selected SNR configuration parameter, and data of the two antennas is merged and output.

In step S103, delay compensation is conducted on the operated data according to the delay information.

Delay compensation is conducted on the operated data according to the delay information acquired after the above fine synchronization operation is conducted.

In step S104, the data of the two antennas on which the delay compensation is conducted is merged and output according to the selected SNR configuration parameter.

A merging system of the two antennas is configured according to different SNR configuration parameters, to complete merging and outputting signals of two antennas.

Two reception channels are used to respectively receive data of two antennas, the fading influences subjected by the reception channels are not related, and the possibility that the two reception channels are influenced by a valley point of deep fading at the same time is very small. Therefore, dual antennas are adopted to respectively receive a signal independently, and then channel selection is conducted or signals of the dual antennas are merged, thereby being able to obtain a signal with extremely small interference and thus improve the mobile performance of the CMMB reception terminal.

Figure 2:
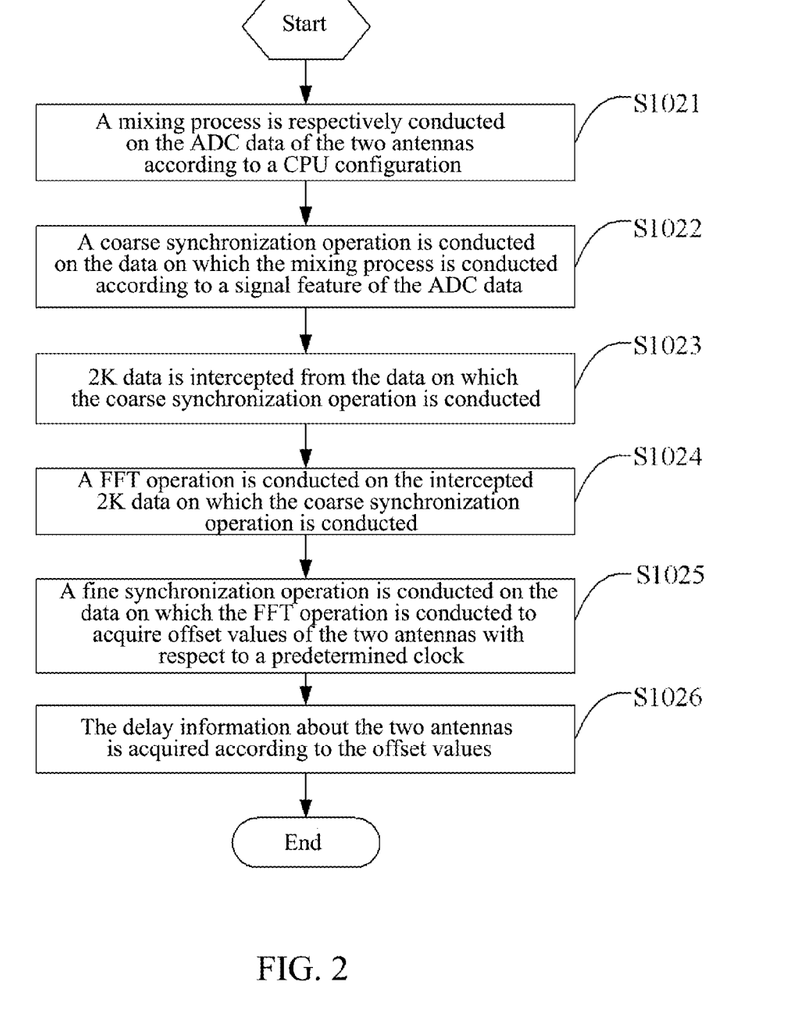
FIG. 2 is a flowchart of respectively conducting a synchronization and FFT operation on the ADC data of the two antennas to obtain delay information about the two antennas in the embodiment of the method for achieving CMMB diversity reception according to the present document.

In a specific implementation, as shown in FIG. 2, the step of respectively conducting a synchronization and FFT operation on the ADC data of the two antennas to acquire delay information about the two antennas in the above step S102 includes the following steps:

In step S1021, a mixing process is respectively conducted on the ADC data of the two antennas according to a CPU configuration.

In step S1022, a coarse synchronization operation is conducted on the data on which the mixing process is conducted according to a signal feature of the ADC data.

In step S1023, 2K data is intercepted from the data on which the coarse synchronization operation is conducted.

Data interception is conducted according to practical requirements. The present embodiment will be described by taking interception of 2K data as an example.

In step S1024, a FFT operation is conducted on the intercepted 2K data on which the coarse synchronization operation is conducted.

In consideration that the synchronous header is obtained by copying 2048 sampling points once, 2048-point FFT is used to transform data from the time-domain into the frequency-domain in the present embodiment.

In step S1025, a fine synchronization operation is conducted on the data on which the FFT operation is conducted to acquire offset values of the two antennas with respect to a predetermined clock.

In step S1026, the delay information about the two antennas is acquired according to the offset values.

In the above steps S1025 and S1026, the predetermined clock is a uniform clock of two reception channels. The fine synchronization operation is conducted according to the FFT operation result, to acquire offset values of two antennas with respect to the uniform clock, and the delay information about the two antennas is acquired according to the offset values.

Figure 3:
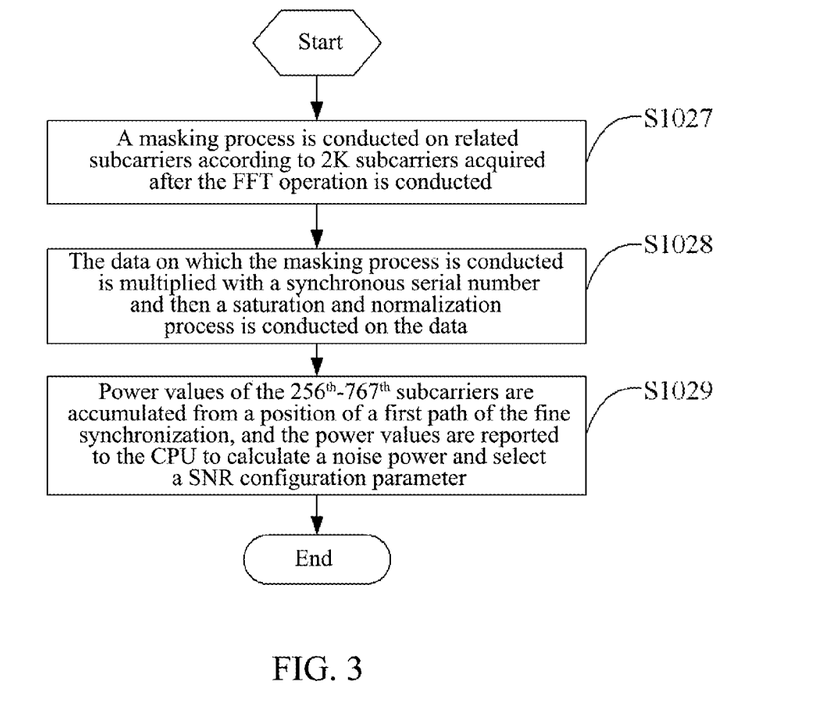
FIG. 3 is a flowchart of selecting a SNR configuration parameter according to an operation result in the embodiment of the method for achieving CMMB diversity reception according to the present document.

As shown in FIG. 3, the step of selecting a SNR configuration parameter according to an operation result in the above step S102 comprises the following steps:

In step S1027, a masking process is conducted on related subcarriers according to 2K subcarriers acquired after the FFT operation is conducted.

After the FFT transform is conducted, some unnecessary direct current subcarrier, idle subcarriers and interference carriers in the frequency domain are masked, and then after the data is multiplied with a synchronous serial number, a saturation and normalization process is conducted on the data.

In step S1028, the data on which the masking process is conducted is multiplied with a synchronous serial number and then a saturation and normalization process is conducted on the data.

In step S1029, power values of the $256^{th}$-$767^{th}$ subcarriers are accumulated from a position of a first path of the fine synchronization, and the power values are reported to the CPU to calculate a noise power and select a SNR configuration parameter.

Power values of the $256^{th}$-$767^{th}$ subcarriers are directly accumulated from a position of a first path of the fine synchronization, and the power values are reported to the CPU to calculate a noise power and select a SNR configuration parameter. In this way, the merging system of the two antennas is configured subsequently according to the selected SNR configuration parameter, and data of the two antennas is merged and output.

The present embodiment adopts dual antennas to respectively receive a signal independently; after the synchronization and FFT operation is conducted on the signal, the SNR configuration parameter selection and delay compensation are conducted according to an operation result; and a merging system of the two antennas is configured according to the selected SNR configuration parameter, and data of the two antennas on which the delay compensation is conducted is merged and output, thereby being able to acquire a signal with extremely small interference and acquire a higher mobile performance.

Figure 4:
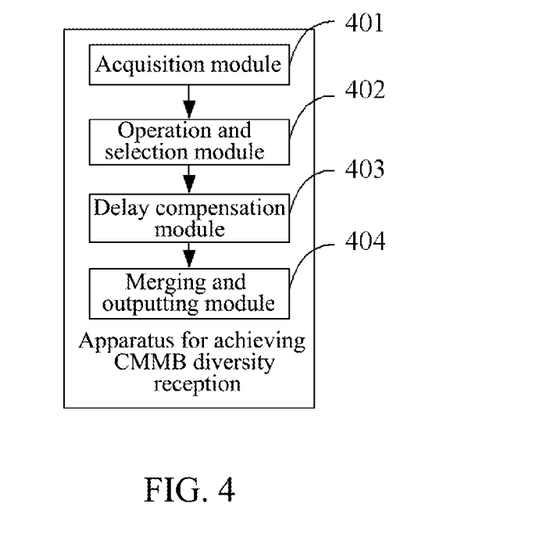
FIG. 4 is a structural diagram of an embodiment of an apparatus for achieving CMMB diversity reception according to the present document.

As shown in FIG. 4, an embodiment of the present invention discloses an apparatus for achieving CMMB diversity reception, comprising an acquisition module 401, an operation and selection module 402, a delay compensation module 403, and a merging and outputting module 404, wherein:

the acquisition module 401 is used to acquire respective ADC data of two antennas;

the operation and selection module 402 is used to respectively conduct a synchronization and FFT operation on the ADC data of the two antennas to acquire delay information about the two antennas, and select a SNR configuration parameter according to an operation result;

the delay compensation module 403 is used to conduct delay compensation on the operated data according to the delay information; and the merging and outputting module 404 is used to merge the data of the two antennas on which the delay compensation is conducted according to the selected SNR configuration parameter and output the data.

Specifically, respective ADC data of the two antennas is firstly acquired respectively by the acquisition module 401, so as to conduct corresponding processes on the ADC data subsequently and then merge and output the data, to obtain a signal with extremely small interference and obtain a higher mobile performance.

Then, the synchronization and FFT operation is conducted on the ADC data of the two antennas by the operation and selection module 402, wherein, the synchronization operation includes a coarse synchronization operation and a fine synchronization operation, and the FFT operation is a 2048-point FFT.

The embodiment relates to an apparatus for time synchronization and antenna merging designed primarily for the basic features of the synchronous header of the CMMB. As the synchronous header is obtained by copying 2048 sampling points once, 2048-point FFT is used to transform data from the time-domain into the frequency-domain.

Firstly, the coarse synchronization operation and then the FFT operation are conducted on the ADC data, and then after the fine synchronization operation is conducted, offset values of the two antennas with respect to the uniform clock is acquired, and delay information about the two antennas can be acquired according to the offset values, so as to subsequently conduct delay compensation on the data of the two antennas by the delay compensation module 403 according to the delay information.

After the FFT transform is conducted, some unnecessary direct current subcarrier, idle subcarriers and interference carriers in the frequency domain are masked, and then after the data is multiplied with a synchronous serial number, a saturation and normalization process is conducted on the data. Then, power values of the $256^{th}$-$767^{th}$ subcarriers are directly accumulated from a position of a first path of the fine synchronization, and the power values are reported to the CPU to calculate a noise power and select a SNR configuration parameter.

The delay compensation module 403 conducts delay compensation on the operated data according to the delay information acquired after the above fine synchronization operation is conducted, and then the merging and outputting module 404 configures a merging system of the two antennas according to different SNR configuration parameters, to complete merging and outputting signals of two antennas.

Two reception channels are used to respectively receive data of two antennas, the fading influences subjected by the reception channels are not related, and the possibility that the two reception channels are influenced by a valley point of deep fading at the same time is very small. Therefore, dual antennas are adopted to respectively receive a signal independently, and then channel selection is conducted or signals of the dual antennas are merged, thereby being able to obtain a signal with extremely small interference and thus improve the mobile performance of the CMMB reception terminal.

Figure 5:
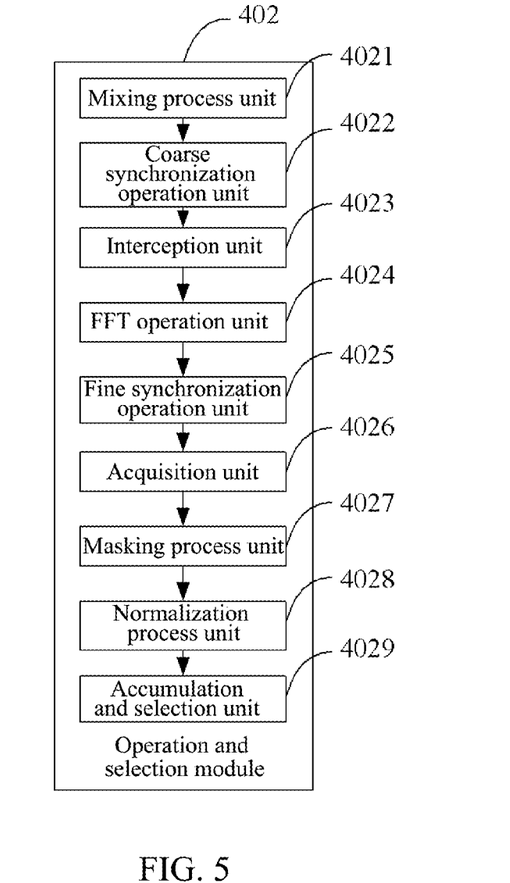
FIG. 5 is a structural diagram of an operation and selection module in the embodiment of the apparatus for achieving CMMB diversity reception according to the present document.

As shown in FIG. 5, the above operation and selection module 402 comprises a mixing process unit 4021, a coarse synchronization operation unit 4022, an interception unit 4023, a FFT operation unit 4024, a fine synchronization operation unit 4025, an acquisition unit 4026, a masking process unit 4027, a normalization process unit 4028 and an accumulation and selection unit 4029, wherein:

the mixing process unit 4021 is used to conduct a mixing process on the ADC data according to a CPU configuration;

the coarse synchronization operation unit 4022 is used to conduct a coarse synchronization operation on the data on which the mixing process is conducted according to a signal feature of the ADC data;

the interception unit 4023 is used to intercept 2K data from the data on which the coarse synchronization operation is conducted;

Data interception is conducted according to practical requirements. The present embodiment will be described by taking interception of 2K data as an example.

The FFT operation unit 4024 is used to conduct a FFT operation on the intercepted 2K data on which the coarse synchronization operation is conducted;

In consideration that the synchronous header is obtained by copying 2048 sampling points once, 2048-point FFT is used to transform data from the time-domain into the frequency-domain in the present embodiment.

The fine synchronization operation unit 4025 is used to conduct a fine synchronization operation on the data on which the FFT operation is conducted to acquire offset values of the two antennas with respect to a predetermined clock;

the acquisition unit 4026 is used to acquire the delay information about the two antennas according to the offset values.

the masking process unit 4027 is used to conduct a masking process on related subcarriers according to 2K subcarriers acquired after the FFT operation is conducted;

the normalization process unit 4028 is used to multiply the data on which the masking process is conducted with a synchronous serial number and then conduct a saturation and normalization process on the data; and the accumulation and selection unit 4029 is used to accumulate power values of the $256^{th}$-$767^{th}$ subcarriers from a position of a first path of the fine synchronization, and report the power values to the CPU to calculate a noise power and select a SNR configuration parameter.

The above description is only the preferred embodiments of the present invention and is not intended to limit the patent scope of the present document. Any equivalent structures or flow transformation made using the contents of the description and accompanying drawings of the present document or directly or indirectly used in other related technical field, should similarly be included in the patent protection scope of the present document.

Industrial Applicability

The method and apparatus for achieving the CMMB diversity reception according to the embodiments of the present invention conduct a synchronization and FFT operation on the respective ADC data of the two antennas to obtain delay information about the two antennas, and select a SNR configuration parameter according to an operation result; according to the delay information, conduct delay compensation on the operated data; and finally according to the selected SNR configuration parameter, configure a merging system of the two antennas, to merge the data of the two antennas on which the delay compensation is conducted, and output the data, thereby being able to obtain a signal with extremely small interference and thus improve the mobile performance of the CMMB reception terminal.

What is claimed is:

1. A method for achieving China Mobile Multimedia Broadcasting (CMMB) diversity reception, comprising:
   acquiring respective Analogue-to-Digital Converter (ADC) data of two antennas;
   respectively conducting a synchronization and Fast Fourier Transform (FFT) operation on the ADC data of the two antennas to acquire delay information about the two antennas, and selecting a signal to noise ratio (SNR) configuration parameter according to an operation result;
   according to the delay information, conducting delay compensation on the operated data; and
   according to the selected SNR configuration parameter, merging the data of the two antennas on which the delay compensation is conducted, and outputting the merged data;
   wherein the step of respectively conducting a synchronization and FFT operation on the ADC data of the two antennas to acquire delay information about the two antennas comprises:
   respectively conducting a mixing process on the ADC data of the two antennas according to a Central Processing Unit (CPU) configuration;
   conducting a coarse synchronization operation on the data on which the mixing process is conducted according to a signal feature of the ADC data;
   conducting a FFT operation on the data on which the coarse synchronization operation is conducted;
   conducting a fine synchronization operation on the data on which the FFT operation is conducted to acquire offset values of the two antennas with respect to a predetermined clock; and
   acquiring the delay information about the two antennas according to the offset values.

2. The method according to claim 1, wherein, before the step of conducting the FFT operation on the data on which the coarse synchronization operation is conducted, the method further comprises:
   intercepting 2K data from the data on which the coarse synchronization operation is conducted, for the FFT operation.

3. The method according to claim 2, wherein, the step of selecting a SNR configuration parameter according to an operation result comprises:
   conducting a masking process on related subcarriers according to 2K subcarriers acquired after the FFT operation is conducted;
   multiplying the data on which the masking process is conducted with a synchronous serial number and then conducting a saturation and normalization process on the data; and
   accumulating power values of the $256^{th}$-$767^{th}$ subcarriers from a position of a first path of the fine synchronization, and reporting the accumulated power values to the CPU so that the CUP calculates a noise power and selects the SNR configuration parameter.

4. The method according to claim 3, wherein, the FFT operation is a 2048-point FFT.

5. The method according to claim 2, wherein, the FFT operation is a 2048-point FFT.

6. The method according to claim 1, wherein, the FFT operation is a 2048-point FFT.

7. An apparatus for achieving China Mobile Multimedia Broadcasting (CMMB) diversity reception, comprising:
   an acquisition module, configured to acquire respective Analogue-to-Digital Converter (ADC) data of two antennas;
   an operation and selection module, configured to respectively conduct a synchronization and Fast Fourier Transform (FFT) operation on the ADC data of the two antennas to acquire delay information about the two antennas, and select a signal to noise ratio (SNR) configuration parameter according to an operation result;
   a delay compensation module, configured to conduct delay compensation on the operated data according to the delay information; and
   a merging and outputting module, configured to merge the data of the two antennas on which the delay compensation is conducted according to the selected SNR configuration parameter and output the merged data;
   wherein the operation and selection module comprises:
   a mixing process unit, configured to respectively conduct a mixing process on the ADC data of the two antennas according to a Central Processing Unit (CPU) configuration;
   a coarse synchronization operation unit, configured to conduct a coarse synchronization operation on the data on which the mixing process is conducted according to a signal feature of the ADC data;
   a FFT operation unit, configured to conduct a FFT operation on the data on which the coarse synchronization operation is conducted;
   a fine synchronization operation unit, configured to conduct a fine synchronization operation on the data on which the FFT operation is conducted to acquire offset values of the two antennas with respect to a predetermined clock; and
   an acquisition unit, configured to acquire the delay information about the two antennas according to the offset values.

8. The apparatus according to claim 7, wherein, the operation and selection module further comprises:
   an interception unit, configured to be connected between the coarse synchronization operation unit and the FFT operation unit, to intercept 2K data from the data on which the coarse synchronization operation is conducted, for the FFT operation.

9. The apparatus according to claim 8, wherein, the operation and selection module further comprises:
   a masking process unit, configured to conduct a masking process on related subcarriers according to 2K subcarriers acquired after the FFT operation is conducted;
   a normalization process unit, configured to multiply the data on which the masking process is conducted with a synchronous serial number and then conduct a saturation and normalization process on the data; and
   an accumulation and selection unit, configured to accumulate power values of the $256^{th}$-$767^{th}$ subcarriers from a position of a first path of the fine synchronization, and report the accumulated power values to the CPU so that the CPU calculates a noise power and selects the SNR configuration parameter.

10. The apparatus according to claim 9, wherein, the FFT operation is a 2048-point FFT.

11. The apparatus according to claim 8, wherein, the FFT operation is a 2048-point FFT.

12. The apparatus according to claim 7, wherein, the FFT operation is a 2048-point FFT.

* * * * *